US008719897B2

(12) United States Patent
Xiao et al.

(10) Patent No.: US 8,719,897 B2
(45) Date of Patent: May 6, 2014

(54) ACCESS CONTROL METHOD FOR TRI-ELEMENT PEER AUTHENTICATION CREDIBLE NETWORK CONNECTION STRUCTURE

(75) Inventors: Yuelei Xiao, Shaanxi (CN); Jun Cao, Shaanxi (CN); Zhenhai Huang, Shaanxi (CN); Li Ge, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 0 days.

(21) Appl. No.: 13/377,098

(22) PCT Filed: Dec. 9, 2009

(86) PCT No.: PCT/CN2009/075444
§ 371 (c)(1),
(2), (4) Date: Dec. 8, 2011

(87) PCT Pub. No.: WO2010/142115
PCT Pub. Date: Dec. 16, 2010

(65) Prior Publication Data
US 2012/0079561 A1    Mar. 29, 2012

(30) Foreign Application Priority Data
Jun. 8, 2009 (CN) .......................... 2009 1 0022911

(51) Int. Cl.
*H04L 29/06*  (2006.01)
*G06F 17/00*  (2006.01)
(52) U.S. Cl.
CPC ........ *H04L 63/0869* (2013.01); *H04L 63/0876* (2013.01)
USPC .............................................. 726/1; 713/150
(58) Field of Classification Search
USPC ............................................................ 726/1
See application file for complete search history.

(56) References Cited

U.S. PATENT DOCUMENTS 7,389,529 B1 * 6/2008 Enderwick et al. ............... 726/1
8,191,113 B2    5/2012 Xiao et al.

FOREIGN PATENT DOCUMENTS

CN    101136928    *    3/2008
CN    101136928 A    3/2008
(Continued)

OTHER PUBLICATIONS

Geier, Jim Geier, James T., Implementing 802.1X Security Solutions for Wired and Wireless Networks, Jun. 2008, Wiley, pp. 39, 46, 47, 57, 111.*

(Continued)

*Primary Examiner* — Andrew Nalven
*Assistant Examiner* — Khang Do
(74) *Attorney, Agent, or Firm* — Harness, Dickey & Pierce, P.L.C.

(57) ABSTRACT

An access control method for a TePA-based TNC architecture is provided, including: 1) performing encapsulation of user authentication protocol data and platform authentication protocol data in the TePA-based TNC architecture: 1.1) encapsulating the user authentication protocol data in a Data field of TAEP packets, and interacting with the TAEP packets between an access requestor and an access controller, and between the access controller and a policy manager, to perform mutual user authentication between the access requestor and the access controller, and establish a secure channel between the access requestor and the access controller; and 1.2) encapsulating the platform authentication protocol data in a Data field of TAEP packets, and, for platform authentication protocol data between the access requestor and the access controller, encapsulating a TAEP packet of the platform authentication protocol data in a Data field of another TAEP packet to form a nested encapsulation.

8 Claims, 2 Drawing Sheets

(56) References Cited

FOREIGN PATENT DOCUMENTS

| | | |
|---|---|---|
| CN | 101242266 A | 8/2008 |
| CN | 101360020 A | 2/2009 |
| CN | 101447992 A | 6/2009 |
| CN | 101572704 A | 11/2009 |
| JP | 2007299342 A | 11/2007 |
| JP | 2008141352 A | 6/2008 |
| JP | 2009118267 A | 5/2009 |
| JP | 2009518762 A | 5/2009 |
| WO | WO-2008024135 A2 | 2/2008 |
| WO | WO-2009018742 A1 | 2/2009 |

OTHER PUBLICATIONS

TCG, TCG Trusted Network Connect TNC Architecture for Interoperability, Apr. 28, 2008, Specification Version 1.3.*

TCG Trusted Network Connect TNC Architecture for Interoperability, Specification Version 1.2, Revision 4, May 21, 2007, TCG 2004-2007.

IEEE Standard for Local and metropolitan area networks—Port-Based Network Access Control, IEEE Std 802.1X™-2010, (Revision of IEEE Std 802.1X-2004) IEEE Computer Society, Feb. 5, 2010, New York, NY.

International Search Report and Written Opinion of the ISA for PCT/CN2009/075444, ISA/CN, mailed Mar. 18, 2010.

Geier, Jim Geier, James T., Implementing 802.1X Security Solutions for Wired and Wireless Networks, Jun. 2008, Wiley, pp. 42, 65, 292.

Translated Korean Office Action dated Jan. 22, 2014. Translation provided by Unitalen Attorneys at Law.

* cited by examiner

ACCESS CONTROL METHOD FOR TRI-ELEMENT PEER AUTHENTICATION CREDIBLE NETWORK CONNECTION STRUCTURE

CROSS-REFERENCE TO RELATED APPLICATIONS

This application is a 371 U.S. National Stage of International Application No. PCT/CN2009/075444, filed Dec. 9, 2009, which claims priority to Chinese Patent Application No. CN 200910022911.3, filed Jun. 8, 2009. The disclosures of the above applications are incorporated herein by reference.

FIELD OF THE INVENTION

The present invention relates to the field of network security technologies, and in particular to an access control method for a Tri-element Peer Authentication (TePA) based Trusted Network Connect (TNC) architecture.

BACKGROUND OF THE INVENTION 802.1x protocols evolve from the standard Wireless Local Area Network (WLAN) protocols, 802.11. A main objective of 802.1x protocols is to provide a solution to access authentication of WLAN users. 802.1x protocols have currently been adapted for access control in common wired Local Area Networks (LANs). For example, Microsoft's Windows XP, and devices manufactured by Cisco and Huawei-3Com now support 802.1x protocols. 802.1x is primarily a set of authentication protocols, i.e., methods and policies for authenticating users. 802.1x is port based. The term "port" may refer to an actual physical port, or a logical port like a Virtual Local Area Network (VLAN). In the case of WLAN, a port may be a channel.

The goal of 802.1x authentication is to determine whether a port can be used. For a port, if authentication is successful, the port is set to be open, allowing all messages to pass; otherwise, the port remains closed, allowing only Extensible Authentication Protocol (EAP) messages to pass. The structure of 802.1x authentication involves three parties: a supplicant, an authenticator, and an authentication server. EAP messages are transmitted transparently by the authenticator to the supplicant or the authentication server; hence, the structure of 802.1x authentication supports only point-to-point authentication.

FIG. 1 is a block diagram of the structure of a TePA-based access control method in the prior art. In order to realize encapsulation of the three-party authentication protocol and transmission control of network data (i.e., transmission control of authentication protocol data and application service data), a TePA-based access control method (which is used in the Chinese WLAN standard) has been proposed and has a structure as shown in FIG. 1. Specifically, PAE refers to a port authentication entity. The supplicant PAE, the authentication access controller PAE and the authentication server transmit Tri-element Authentication Extensible Protocol (TAEP) packets. The supplicant PEA and the authentication access controller PAE also perform control of the controlled port. TAEP packets have a format similar to that of the EAP packets, but TAEP has a hierarchy model different from that of EAP.

The format of a TAEP packet is illustrated below:

| Code (8 bits) | Identifier (8 bits) | Length (16 bits) |
|---|---|---|
| Data | | | where,
Code:
the Code field has a length of 1 byte, representing the type of the TAEP packet:
1 Request
2 Response
3 Success
4 Failure
Identifier:
the Identifier field has a length of 1 byte, for matching the Request packet with the Response packet;
Length:
the Length field has a length of 2 bytes, representing the number of bytes of the whole TAEP packet, i.e., the sum of the lengths of all the fields including Code, Identifier, Length and Data;
Data:
the length of the Data field is variable, e.g., zero or more bytes, and its format is determined by the value of the Code field.

The multiplex model of TAEP is illustrated below:

| Supplicant TAEP authentication methods | Authentication access controller TAEP authentication methods | Authentication server TAEP authentication methods |
|---|---|---|
| TAEP peer layer | TAEP authentication access controller layer | TAEP peer layer |
| TAEP layer | TAEP layer | TAEP layer |
| Lower layer | Lower layer   Transmission layer | Transmission layer |

TAEP messages are exchanged according to the following steps:

a) The authentication access controller sends a Request packet to the supplicant, to request initiation of authentication. The Request packet includes a type field indicating the type of the requested. Specifically, the type of the requested is Identity which represents an identity.

b) In response to a valid Request, the supplicant sends a Response packet to the authentication access controller. The Response packet includes a type field corresponding to the type field in the Request packet, and the identity of the peer is included in the message.

c) The authentication access controller sends a Request packet to the authentication server. The Request packet includes a type field indicating the type of the requested. Specifically, the type of the requested is Third Party (TP) Authentication which is used to request the type of the authentication method from the authentication server.

d) The authentication server sends a Request packet to the authentication access controller. The Response packet includes a type field corresponding to the type field in the Request packet.

e) The authentication access controller selects an authentication method according to the type of the authentication method returned by the authentication server, to initiate authentication. A Request packet is sent to the supplicant, and a Response packet is sent by the supplicant to the authentication access controller. The interaction with Request packets and Response packets continues as needed. The authentication access controller sends Request packets to the authentication server, and the authentication server sends Response packets to the authentication access controller. The sequence of Request packets and Response packets may continue as desired. The authentication access controller is responsible for retransmission of Request packets.

f) The interaction may continue until the authentication access controller determines that it can not authenticate the supplicant, in which case the authentication access controller sends a Failure packet to the supplicant; or, determines that successful authentication is completed, in which case the authentication access controller stops sending Request packets to end the message interaction or sends a Success packet to the supplicant.

The steps c) and d) are optional. In some cases, when the authentication method is pre-determined, or when the authentication method and the identity are determined in other ways, the steps c) and d) are optional.

With the development of informatization, problems of malicious software such as viruses and worms are growing. Currently, more than 35,000 forms of malicious software have been found, and more than 40,000,000 computers are infected each year. To this end, the Trusted Computing Group (TCG) has developed a network access specification based on Trusted Computing, i.e., Trusted Network Connect (TNC), hereinafter referred to as TCG-TNC, which includes an open architecture for endpoint integrity and a set of standards that ensure secure interoperability. As shown in FIG. 2, a schematic diagram of a TCG-TNC architecture in the prior art, the policy enforcement point in the architecture is at the edge of the network, and the access requestor does not perform platform authentication on the policy enforcement point; hence, the policy enforcement point can not be relied upon. To solve this problem, a Tri-element Peer Authentication (TePA) based TNC architecture has been proposed.

Reference is made to FIG. 3, a schematic diagram of a TePA-based TNC architecture in the prior art. In the TePA-based TNC architecture, the network access control layer is a traditional network access technology mechanism, which performs the tri-element peer authentication protocol (a three-party authentication protocol) to realize mutual user authentication, and uses the TePA-based access control method discussed above for encapsulation of the user authentication protocol and transmission control of network data. However, besides the network access control layer, the TePA-based TNC architecture as shown in FIG. 3 also includes an integrity measurement layer and a trusted platform evaluation layer, which execute a platform authentication protocol to perform identification, authentication and evaluation of platform component information. In addition, the platform authentication protocol data also need to be transmitted in the network access control layer, and are allowed, blocked or isolated (as compared with the access result in a traditional network access technology which is to allow or to block) according to an access result generated from the platform authentication result. Therefore, the TePA-based access control method discussed above is not suitable for a TePA-based TNC architecture. Hence, it is desired to establish an access control method for a TePA-based TNC architecture.

SUMMARY OF THE INVENTION

An object of the present invention is to provide an access control method for a tri-element peer authentication based trusted network connect architecture, to solve the technical problems described above.

The technical solution according to an embodiment of the present invention includes an access control method for a Tri-element Peer Authentication (TePA) based Trusted Network Connect (TNC) architecture, and the method includes the steps of:
1) performing encapsulation of user authentication protocol data and platform authentication protocol data in the TePA-based TNC architecture:
1.1) encapsulating the user authentication protocol data in a Data field of Tri-element Authentication Extensible Protocol (TAEP) packets, and interacting with the TAEP packets between an access requestor and an access controller, and between the access controller and a policy manager, to perform mutual user authentication between the access requestor and the access controller, and establish a secure channel between the access requestor and the access controller; and
1.2) encapsulating the platform authentication protocol data in a Data field of TAEP packets, and, for platform authentication protocol data between the access requestor and the access controller, encapsulating a TAEP packet of the platform authentication protocol data in a Data field of another TAEP packet to form a nested encapsulation, wherein the TAEP packet of the platform authentication protocol data is protected by the secure channel established according to step 1.1); and for platform authentication protocol data between the access controller and the policy manager, transmitting directly a TAEP packet of the platform authentication protocol data.

The method above may further includes a step 2) of: using a port-based control mechanism, or using a filter tunneling transmission control technique, or using both the port-based control mechanism and the filter tunneling transmission control technique, to perform transmission control of network data in the TePA-based TNC architecture.

In step 2), if a port-based control mechanism is used to perform transmission control of network data in the TePA-based TNC architecture, a port state, isolated; is added for a controlled port in the structure of a TePA-based access control method in a traditional network access technology, to form the structure of the new TePA-based access control method, and allowing, blocking and isolation functions of the TePA-based TNC architecture are realized through an authorized state, an unauthorized state and the isolated state of the controlled port in the structure of the new TePA-based access control method, respectively.

In step 2), if both the port-based control mechanism and the filter tunneling transmission control technique are used to perform transmission control of network data in the TePA-based TNC architecture, allowing and blocking functions of the TePA-based TNC architecture are realized through an authorized state and an unauthorized state of a controlled port in the structure of a TePA-based access control method in a traditional network access technology, respectively; and an isolation function of the TePA-based TNC architecture is realized by using the filter tunneling transmission control technique.

The TAEP packet with nested encapsulation may have a structure below:

| Code (8 bits) | Identifier (8 bits) | Length (16 bits) |
|---|---|---|
| Data (TAEP packet) | | |

The access control method for a TePA-based TNC architecture according to an embodiment of the present invention has the following advantages:

1. Nested encapsulation of TAEP packets is used in the encapsulation and transmission of user authentication protocol data and platform authentication protocol data, so that the access control method for a TePA-based TNC architecture is compatible with the TePA-based access control method in a traditional network access technology, thereby improving compatibility.

2. When the three access results in the TePA-based TNC architecture are based solely on port control, simply an isolated state is added for the controlled port in the access requestor system and the access controller system, so that the port-based control mechanism of the TePA-based TNC architecture is compatible with the port-based control mechanism of the TePA-based access control method in a traditional network access technique, thereby improving compatibility.

3. The structure of the modified TePA-based access control method realizes an isolation function, so that the platform remediation service can be provided in a centralized manner to the users by the network, thereby improving applicability.

DETAILED DESCRIPTION OF THE INVENTION

The access control method for a TePA-based TNC architecture according to an embodiment of the present invention includes encapsulation of user authentication protocol data and platform authentication protocol data in the TePA-based TNC architecture, and transmission control of network data in the TePA-based TNC architecture.

To realize encapsulation of user authentication protocol data and platform authentication protocol data in the TePA-based TNC architecture, nested TAEP encapsulation is performed on the user authentication protocol data and the platform authentication protocol data in the TePA-based TNC architecture. Specifically, the method includes:

1.1) encapsulating the user authentication protocol data in a Data field of TAEP packets, and interacting with the TAEP packets between an access requestor and an access controller, and between the access controller and a policy manager, to perform mutual user authentication between the access requestor and the access controller, and establish a secure channel between the access requestor and the access controller; and 1.2) encapsulating the platform authentication protocol data in a Data field of TAEP packets, and, for platform authentication protocol data between the access requestor and the access controller, encapsulating a TAEP packet of the platform authentication protocol data in a Data field of another TAEP packet to form a nested encapsulation, wherein the TAEP packet of the platform authentication protocol data is protected by the secure channel established according to step 1.1); and for platform authentication protocol data between the access controller and the policy manager, transmitting directly a TAEP packet of the platform authentication protocol data without nested encapsulation.

The TAEP packet with nested encapsulation has a structure below:

| Code (8 bits) | Identifier (8 bits) | Length (16 bits) |
|---|---|---|
| Data (TAEP packet) | | |

Realization of transmission control of network data in the TePA-based TNC architecture refers to realization of transmission control of user authentication protocol data, platform authentication protocol data and application service data in the TePA-based TNC architecture, which can be performed using a port-based control mechanism, or using other transmission control techniques such as filter tunneling, or using both of the techniques above. The access results (access control) of the TePA-based TNC architecture include allowed, blocked and isolated, and a main objective of isolation is to remedy the platform.

Figure 4:
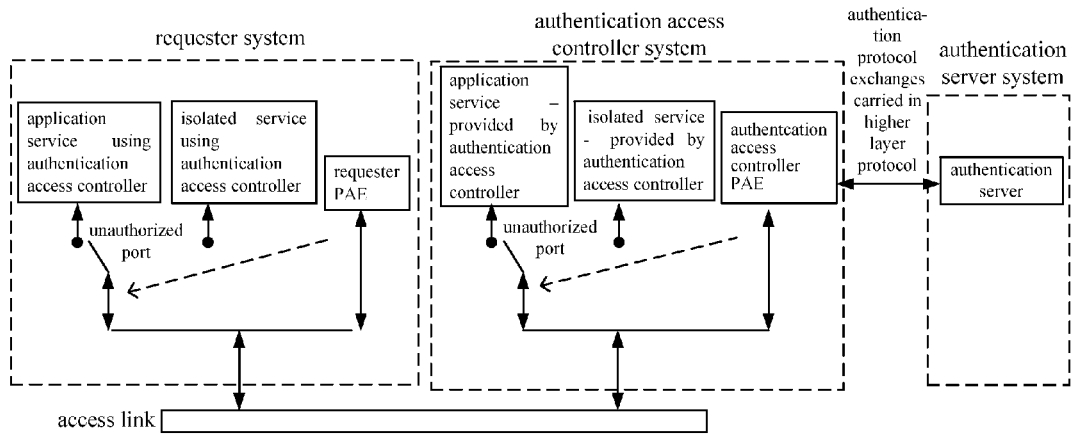
FIG. 4 is a schematic diagram of the structure of a TePA-based access control method according to an embodiment of the present invention.

FIG. 4 is a schematic diagram of the structure of a TePA-based access control method according to an embodiment of the present invention. If it is based solely on port control, the structure of the TePA-based access control method discussed in the background section is modified to the structure shown in FIG. 4, so as to realize the three access results of the TePA-based TNC architecture, in which the access requestor, the access controller and the policy manager in the TePA-based TNC architecture correspond to the supplicant, the authentication access controller and the authentication server in FIG. 4, respectively. In FIG. 4, the supplicant PAE and the authentication access controller PAE use the uncontrolled port to transmit user authentication protocol data and platform authentication protocol data (encapsulated in TAEP packets). Application service data and platform remediation service data can not be transmitted using the uncontrolled port. The supplicant PAE and the authentication access controller PAE set the port state for the controlled port according to the three access results of the TePA-based TNC architecture, if the access result is to allow, the state of the controlled port is set to be authorized, and the controlled port may be used to transmit application service data; if the access result is to isolate, the state of the controlled port is set to be isolated, and the controlled port may be used to transmit platform remediation service data; and if the access result is to block, the state of the controlled port is set to be unauthorized, and the controlled port can not be used to transmit any data.

Figure 1:
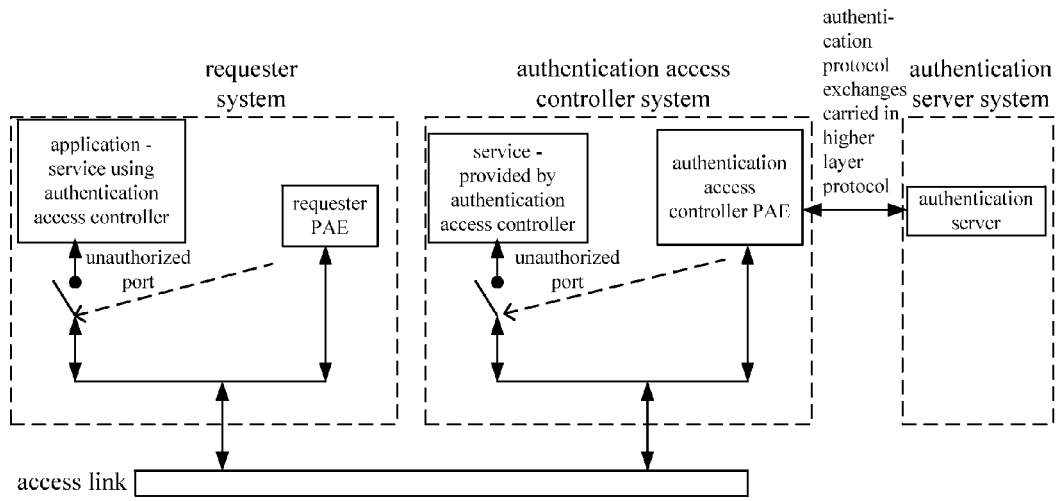
FIG. 1 is a block diagram of the structure of a TePA-based access control method in the prior art.
Figure 2:
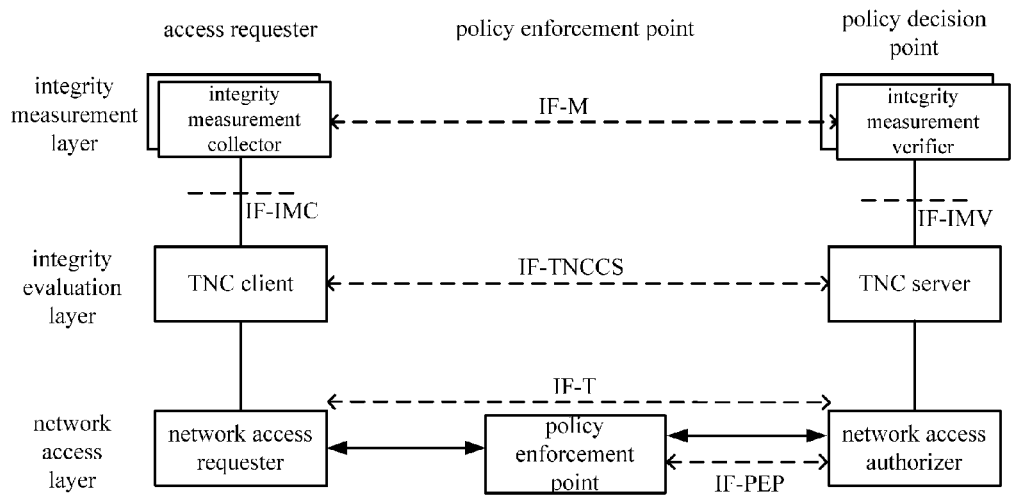
FIG. 2 is a schematic diagram of a TCG-TNC architecture in the prior art.
Figure 3:
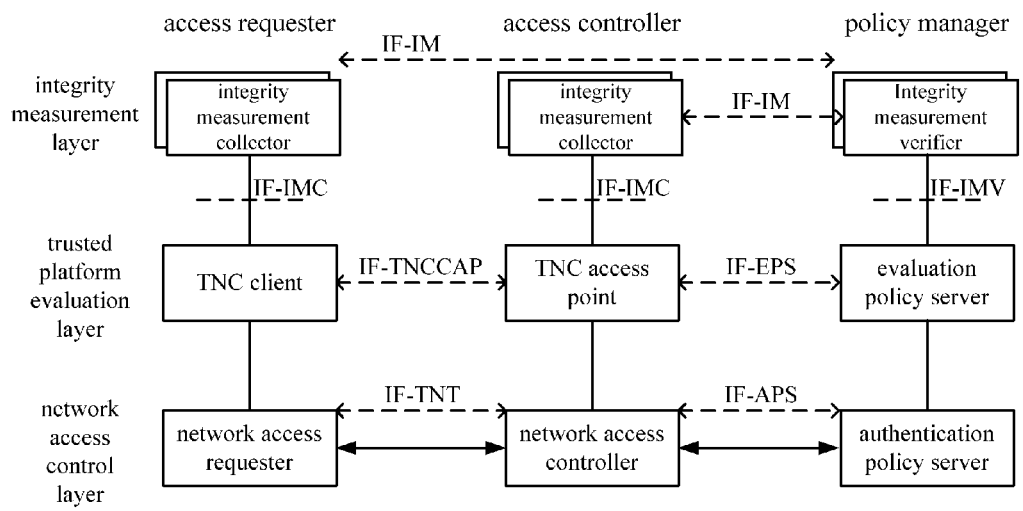
FIG. 3 is a schematic diagram of a TePA-based TNC architecture in the prior art.

If both the port-based control mechanism and another transmission control technique are used, the structure of the TePA-based access control method discussed in the background section may be used for allowing and blocking functions of the TePA-based TNC architecture, in which the access requestor, the access controller and the policy manager in the TePA-based TNC architecture correspond to the supplicant, the authentication access controller and the authentication server in FIG. 1 respectively; and another transmission control technique is used for isolation function of the TePA-based TNC architecture. Specifically, the supplicant PAE and the authentication access controller PAE use the uncontrolled port to transmit user authentication protocol data and platform authentication protocol data (encapsulated in TAEP packets); and application service data can not be transmitted using the uncontrolled port. The supplicant PAE and the authentication access controller PAE set the port state of the controlled port according to an allowing result or a blocking result of the TePA-based TNC architecture, if the access result is to allow, the state of the controlled port is set to be authorized, and the controlled port may be used to transmit application service data; and if the access result is to block, the state of the controlled port is set to be unauthorized, and the controlled port can not be used to transmit any data.

The invention claimed is:

1. An access control method for a Tri-element Peer Authentication (TePA) based Trusted Network Connect (TNC) architecture, comprising:

1) performing encapsulation of user authentication protocol data and platform authentication protocol data in the TePA-based TNC architecture:

1.1) encapsulating the user authentication protocol data between an access requestor and an access controller in a Data field of a first group of Tri-element Authentication Extensible Protocol (TAEP) packets, and encapsulating the user authentication protocol data between the access controller and a policy manager in a Data field of a second group of TAEP packets, and exchanging the first group of TAEP packets between the access requestor and the access controller, and exchanging the second group of TAEP packets between the access controller and the policy manager, to perform mutual user authentication between the access requestor and the access controller, and establish a secure channel between the access requestor and the access controller; and 1.2) encapsulating the platform authentication protocol data between the access requestor and the access controller in a Data field of a third group of TAEP packets and encapsulating the platform authentication protocol data between the access controller and the policy manager in a Data field of a fourth group of TAEP packets, and, for the platform authentication protocol data between the access requestor and the access controller, encapsulating a packet of the third group of TAEP packets in a Data field of a packet of a fifth group of TAEP packets to form a nested encapsulation, wherein the third group of TAEP packets of the platform authentication protocol data is protected by the secure channel established according to step 1.1), and the fifth group of TAEP packets are transmitted between the access requestor and the access controller; and for platform authentication protocol data between the access controller and the policy manager, the fourth group of TAEP packets of the platform authentication protocol data being transmitted directly between the access controller and the policy manager.

2. The access control method for a TePA-based TNC architecture according to claim 1, further comprising: a step 2) of using a port-based control mechanism, or using a filter tunneling transmission control technique, or using both the port-based control mechanism and the filter tunneling transmission control technique, to perform transmission control of network data in the TePA-based TNC architecture.

3. The access control method for a TePA-based TNC architecture according to claim 2, wherein if a port-based control mechanism is used in step 2) to perform transmission control of network data in the TePA-based TNC architecture, a port state, isolated, is added for a controlled port in a structure of a TePA-based access control method in a traditional network access technology, to form a structure of a new TePA-based access control method, and allowing, blocking and isolation functions of the TePA-based TNC architecture are realized through an authorized state, an unauthorized state and the isolated state of the controlled port in the structure of the new TePA-based access control method, respectively.

4. The access control method for a TePA-based TNC architecture according to claim 2, wherein if both the port-based control mechanism and the filter tunneling transmission control technique are used in step 2) to perform transmission control of network data in the TePA-based TNC architecture, allowing and blocking functions of the TePA-based TNC architecture are realized through an authorized state and an unauthorized state of a controlled port in a structure of a TePA-based access control method in a traditional network access technology, respectively; and an isolation function of the TePA-based TNC architecture is realized by using the filter tunneling transmission control technique.

5. The access control method for a TePA-based TNC architecture according to claim 1, wherein the packet of the fifth group of TAEP packets with nested encapsulation has a structure below:

| Code (8 bits) | Identifier (8 bits) | Length (16 bits) |
|---|---|---|
| Data (a packet of the third group of TAEP packets) | | | wherein, the Code field representing a type of the TAEP packet; the Identifier field matching a Request packet with a Response packet; the Length field representing the number of bytes of the whole TAEP packet; and the length of the Data field is variable and the format of which is determined by the value of the Code field.

6. The access control method for a TePA-based TNC architecture according to claim 2, wherein the packet of the fifth group of TAEP packets with nested encapsulation has a structure below:

| Code (8 bits) | Identifier (8 bits) | Length (16 bits) |
|---|---|---|
| Data (a packet of the third group of TAEP packets) | | | wherein, the Code field representing a type of the TAEP packet; the Identifier field matching a Request packet with a Response packet; the Length field representing the number of bytes of the whole TAEP packet; and the length of the Data field is variable and the format of which is determined by the value of the Code field.

7. The access control method for a TePA-based TNC architecture according to claim 3, wherein the packet of the fifth group of TAEP packets with nested encapsulation has a structure below:

| Code (8 bits) | Identifier (8 bits) | Length (16 bits) |
|---|---|---|
| Data (a packet of the third group of TAEP packets) | | | wherein, the Code field representing a type of the TAEP packet; the Identifier field matching a Request packet with a Response packet; the Length field representing the number of bytes of the whole TAEP packet; and the length of the Data field is variable and the format of which is determined by the value of the Code field.

8. The access control method for a TePA-based TNC architecture according to claim 4, wherein the packet of the fifth group of TAEP packets with nested encapsulation has a structure below:

| Code (8 bits) | Identifier (8 bits) | Length (16 bits) |
| --- | --- | --- |
| Data (a packet of the third group of TAEP packets) | | | wherein, the Code field representing a type of the TAEP packet; the Identifier field matching a Request packet with a Response packet; the Length field representing the number of bytes of the whole TAEP packet; and the length of the Data field is variable—and the format of which is determined by the value of the Code field.

\* \* \* \* \*